(12) United States Patent
Gazel et al.

(10) Patent No.: US 7,277,302 B2
(45) Date of Patent: Oct. 2, 2007

(54) 12-PULSE CONVERTER INCLUDING A FILTER CHOKE INCORPORATED IN THE RECTIFIER

(75) Inventors: Nicolas Gazel, Soisy sur Seine (FR); Regis Meuret, Chatou (FR)

(73) Assignee: Hispano Suiza, Colombes (FR)

( * ) Notice: Subject to any disclaimer, the term of this patent is extended or adjusted under 35 U.S.C. 154(b) by 283 days.

(21) Appl. No.: 11/012,308

(22) Filed: Dec. 16, 2004

(65) Prior Publication Data

US 2005/0135126 A1    Jun. 23, 2005

(30) Foreign Application Priority Data

Dec. 19, 2003   (FR) ................................. 03 14997

(51) Int. Cl.
*H02M 5/10* (2006.01)
(52) U.S. Cl. .............................. 363/5; 363/37; 363/48; 363/154
(58) Field of Classification Search .................. 363/3, 363/5, 34, 37, 39, 45, 48, 154, 155
See application file for complete search history.

(56) References Cited

U.S. PATENT DOCUMENTS

| | | | |
|---|---|---|---|
| 27,696 A | | 4/1860 | Cook |
| 4,779,181 A | * | 10/1988 | Traver et al. ................ 363/154 |
| 4,876,634 A | * | 10/1989 | Paice ............................. 363/5 |
| 5,079,499 A | * | 1/1992 | Owen .......................... 323/361 |
| 5,124,904 A | * | 6/1992 | Paice ............................. 363/3 |
| 5,148,357 A | * | 9/1992 | Paice ............................. 363/5 |
| 5,414,612 A | | 5/1995 | Bjorklund et al. ............ 363/35 |
| 5,455,759 A | | 10/1995 | Paice .......................... 363/126 |
| 5,781,428 A | * | 7/1998 | Paice .......................... 363/126 |
| 6,101,113 A | * | 8/2000 | Paice .......................... 363/126 |
| 6,525,951 B1 | * | 2/2003 | Paice .......................... 363/154 |
| 6,650,557 B2 | * | 11/2003 | Ferens et al. ............... 363/126 |

FOREIGN PATENT DOCUMENTS

GB          27696       0/1911

OTHER PUBLICATIONS

Sewan Choi, et al., "Polyphase Transformer Arrangements With Reduced kVA Capacities For Harmonic Current Reduction in Rectifier Type Utility Interface", IEEE, XP010150581, 1995, pp. 353-359.
Patent Abstracts of Japan, JP 04 026364 A, Jan. 29, 1992.

* cited by examiner

*Primary Examiner*—Jeffrey Sterrett
(74) *Attorney, Agent, or Firm*—Oblon, Spivak, McClelland, Maier & Neustadt, P.C.

(57) ABSTRACT

The invention provides a 12-pulse converter comprising an autotransformer having a primary winding connected in a delta configuration and two secondary windings connected in star configurations, the two secondary windings being connected to two rectifier bridges that are enabled to operate in parallel by two interphase chokes, the converter further comprising means for generating an additional magnetic leakage flux in at least one of the interphase chokes so as to incorporate a smoothing choke therein.

6 Claims, 6 Drawing Sheets

12-PULSE CONVERTER INCLUDING A FILTER CHOKE INCORPORATED IN THE RECTIFIER

BACKGROUND OF THE INVENTION

The invention relates to a 12-pulse converter (i.e. a converter operating on 12 half-cycles), with a polyphase autotransformer for converting an alternating current (AC) supply into a direct current (DC) supply.

The field of application is particularly that of control systems for electric motors, in particular for electrically controlled equipment in an aircraft, such as the thrust reversers of an airplane.

In such applications, it is known to make an electric motor control system of the type comprising a converter, an inverter, and an input filter for the inverter.

FIG. 10 shows a converter 101 whose output is connected via an input filter 145 to an inverter 141 for the purpose of varying the speed of a motor 143 depending on requirements.

The input filter 145 comprises a smoothing choke 147 and a capacitor 149. The smoothing choke 147 serves to filter the DC supply output from the converter 101. It also serves to limit and smooth the current drawn by the capacitor 149 when the circuit is switched on. In addition, the smoothing choke 147 serves to limit harmonic rejection associated with the switching of the inverter 141.

In general, the converter comprises a transformer in a polyphase configuration for reducing the kVA rating of the transformer.

A publication by Choi et al. entitled "Polyphase transformer arrangements with reduced kVA capacities for harmonic current reduction in rectifier-type utility interface" (Vol. 11, No. 5), published by IEEE in September 1996, describes a converter comprising an autotransformer having a primary winding connected in a delta configuration and two secondary windings connected in a star configuration. The two secondary windings of the autotransformer are connected to two rectifier bridges with parallel operation thereof being ensured by two interphase chokes.

In many applications, particularly in aerospace, a problem that needs to be solved is reducing the weight and the volume of electric motor control systems.

OBJECT AND BRIEF SUMMARY OF THE INVENTION

The invention seeks to provide an electric motor converter system of small weight and compact volume, while nevertheless having very good reliability.

This object is achieved by using a 12-pulse converter comprising an autotransformer having a primary winding connected in a delta configuration and two secondary windings connected in star configurations, the two secondary windings being connected to two rectifier bridges that are enabled to operate in parallel by two interphase chokes, the converter further comprising means for generating an additional magnetic leakage flux at at least one of the interphase chokes so as to incorporate a smoothing choke therein.

Thus, by incorporating a smoothing choke in at least one interphase choke of the converter it is possible to provide an electric motor control system that does not have a smoothing choke in the input filter to the inverter of the control system. This enables the weight, the volume, and the cost of the control system to be reduced. It also makes it possible to reduce the number of connections and to increase the reliability of the control system.

Preferably, said means generate an additional magnetic leakage flux in each of the interphase chokes.

In a first embodiment of the invention, the means for generating an additional magnetic leakage flux comprise a magnetic circuit shunting a portion of the main magnetic flux generated by at least one of the interphase chokes.

Advantageously, the magnetic circuit may be made out of one of the following alloys: a silicon iron alloy, a cobalt iron alloy, and an amorphous material alloy.

In a second embodiment of the invention, the means for generating an additional magnetic leakage flux comprise an additional number of turns in a coil included in at least one of the interphase chokes.

Preferably, the coils of the interphase chokes are made using flat wire.

The invention also provides an electric motor control system comprising an inverter and a converter according to any of the above characteristics, said converter being coupled to said inverter via an intervening capacitor.

BRIEF DESCRIPTION OF THE DRAWINGS

The invention will be better understood on reading the following description given by way of non-limiting indication with reference to the accompanying drawings, in which.

DETAILED DESCRIPTION OF EMBODIMENTS OF THE INVENTION

Figure 1:
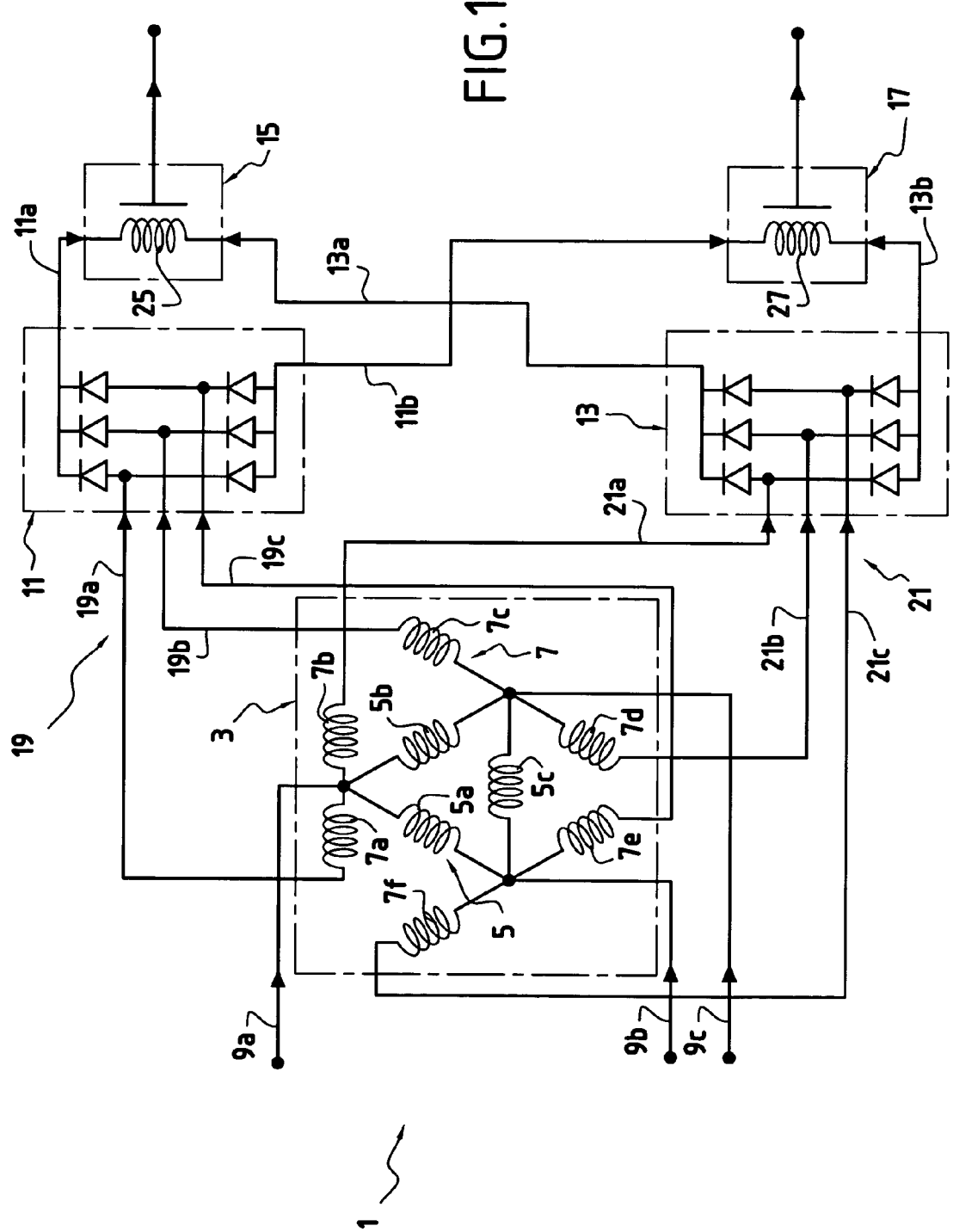
FIG. 1 is a circuit diagram of a 12-pulse converter comprising an autotransformer and interphase chokes.

FIG. 1 is a highly diagrammatic representation of a 12-pulse converter 1 comprising an autotransformer 3 having a primary winding 5 in a delta configuration and two secondary windings 7 in star configurations. The primary winding 5 comprises windings 5a, 5b, and 5c, while the two secondary windings 7 comprise windings 7a to 7f.

The two secondary windings 7 are connected to two rectifier bridges 11 and 13, and operation thereof in parallel is ensured by two interphase chokes 15 and 17.

The autotransformer 3 converts a three-phase supply, e.g. the power supply on board an airplane, as applied to conductors 9a, 9b, and 9c, into a first sub-supply 19 comprising conductors 19a, 19b, and 19c, and a second sub-supply 21 comprising conductors 21a, 21b, and 21c.

The first and second sub-supplies 19 and 21 created by the autotransformer 3 are mutually phase-shifted by 30°. They are shifted respectively by +15° and by −15° relative to the input three-phase supply.

It should be observed that by imparting a 30° phase shift between the two sub-supplies 19 and 21, the autotransformer operates as a passive filter reducing the 5th and the 7th harmonics of the power supply current.

The first sub-supply 19 is rectified by a rectifier bridge 11, e.g. using a six-diode bridge. Similarly, the second sub-supply 21 is rectified by the rectifier bridge 13.

The outputs 11a, 11b, 13a, and 13b from the rectifier bridges 11 and 13 are combined by the two interphase chokes 15 and 17. The two interphase chokes 15 and 17 comprise center-tapped coils 25 and 27 such that the outputs 11a and 13a are interconnected by the coil 25 of the interphase choke 15 and the outputs 11b and 13b are interconnected by the coil 27 of the interphase choke 17.

Thus, the two rectifier bridges 11 and 13 deliver waves at voltages that are identical but at a phase offset, operating in parallel via the two interphase chokes 15 and 17 to deliver a rectified voltage having a pulse index equal to 12.

The center-tapped coils 25 and 27 of the interphase chokes 15 and 17 act as a voltage divider, such that the mean of the two voltages rectified by the rectifier bridges 11 and 13 forms a DC output voltage from the converter 1.

Figure 2:
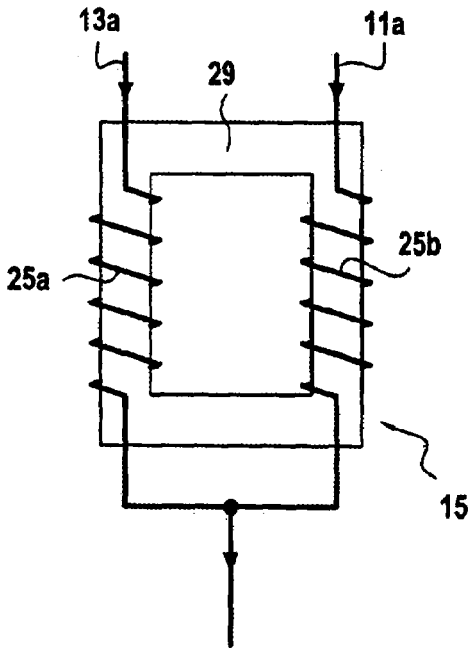
FIG. 2 shows one of the interphase chokes of FIG. 1 in greater detail.

FIG. 2 shows one of the two interphase chokes of FIG. 1 in greater detail, e.g. the interphase choke 15, it being understood that the two interphase chokes are similar.

The coil 25 of the interphase choke 15 comprises two windings 25a and 25b about a ferromagnetic core referred to below in the description as the magnetic circuit 29. The winding 25a of self-inductance L is on one branch of the magnetic circuit 29, while the winding 25b likewise of self-inductance L is on the opposite branch of the magnetic circuit 29, thereby forming a center-tapped coil.

The coupling between the two windings 25a and 25b generates, for each winding, mutual inductance M such that the leakage inductance $L_f$ from each winding is equal to L−M, and the total inductance $L_T$ of the interphase choke 15 is equal to 2L+2M.

It is known that the dimensioning of each of the interphase chokes 15, 17 depends on the current that flows as a result of a difference between the output currents from the two rectifier bridges 11 and 13. Thus, the total inductance $L_T$ can be determined as a function of the desired level of ripple.

Figure 3:
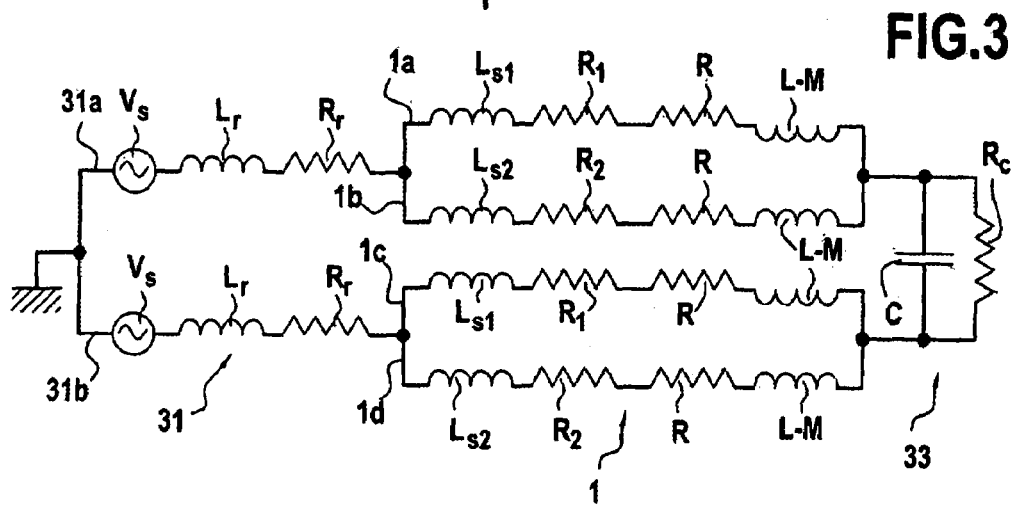
FIG. 3 is an equivalent electrical circuit diagram for the FIG. 1 converter and its power supply.

FIG. 3 is the equivalent electrical circuit diagram at a given instant of the converter 1 powered from a source 31 and delivering into a load 33.

The source 31 delivers an AC voltage having a root mean square (rms) value of about 115 volts (V), for example, and the input frequency is about 400 hertz (Hz), for example.

By way of example, the rms value of an input voltage from an airplane supply may lie in the range 80 V to 180 V, and the input frequency may lie in the range 360 Hz to 800 Hz.

The diagram shows that the power supply or source 31 is equivalent to two branches 31a and 31b each comprising an AC voltage source $V_s$ and a supply inductance $L_r$ together with a supply resistance $R_r$.

In order to make it possible in accordance with the invention to incorporate a smoothing choke in the converter 1, it is important to take into consideration the fact that the load 33 on the converter 1 includes a capacitor. The load 33 is thus represented by a capacitance C in parallel with a resistance $R_c$.

The load capacitor 33 leads to a resonance phenomenon at a frequency $f_r$ at the output from the converter 1. This resonant frequency $f_r$ depends on the capacitance C of the capacitor and on the impedance $L_{eq}$ upstream from the load 33, in application of the following formula:

$$f_r = \frac{1}{2\pi\sqrt{L_{eq}C}}$$

In addition, for questions of filtering and current smoothing, the inductance of each of the interphase chokes 15 and 17 of the converter 1 must not be zero. That means it is necessary for the leakage inductance of each of the interphase chokes 15 and 17 to appear.

The converter 1 is represented by four branches 1a to 1d, each including a leakage inductance and the resistance of a secondary winding 7 of the autotransformer 3, and also the leakage inductance and the resistance of a winding in one of the interphase chokes 15 and 17.

Thus, each of the branches 1a and 1c comprises a leakage inductance $L_{s1}$ and a resistance $R_1$ for the first secondary winding of the autotransformer 3, and the leakage inductance L−M and the resistance R of a respective one of the windings of the interphase choke 15.

Similarly, each of the branches 1b and 1d comprises a leakage inductance $L_{s2}$ and a resistance $R_2$ of the second secondary winding of the autotransformer 3, and the leakage inductance L−M and the resistance R of a respective one of the windings of the interphase choke 17.

Consequently, the equivalent impedance $L_{eq}$ upstream from the load 33 is defined by the following formula:

$$L_{eq} = 2\frac{(L_{s1} + L - M)(L_{s2} + L - M)}{L_{s1} + L_{s2} + 2L - 2M} + 2L_r$$

When the autotransformer is accurately balanced, i.e. when $L_{s1}=L_{s2}$, then the equivalent impedance reduces to the following formula:

$$L_{eq} = L_{s1} + L - M + 2L_r$$

The output voltage from the converter 1 is a DC voltage, e.g. of about 270 V. This output voltage is made up of harmonics $h \times f_{source}$, where h is the order of the harmonic. The harmonics might coincide with the resonant frequency $f_r$, which would lead to accentuating current ripple in the load capacitor at the frequency $h \times f_{source}$.

This ripple degrades the harmonic content of the input current of the converter 1 since it causes the currents delivered by the two rectifier bridges 11 and 13 to alternate. It is thus necessary to place the resonant frequency near low frequencies so that the converter 1 becomes less sensitive to this phenomenon. To do this, it suffices to increase solely the equivalent inductance $L_{eq}$, since increasing the capacitance C would contribute to increasing the amount of current that is drawn.

The principle of the invention is to make use of the interphase choke(s) 15 and/or 17 so as to avoid adding any inductance in series with the capacitance C in the load 33.

By degrading the coupling coefficient of the self-inductance of the windings in at least one of the two interphase chokes 15 and 17, an additional magnetic leakage flux is generated which increases the leakage inductance L−M. This additional leakage inductance is added to the equivalent inductance. Under such circumstances, the total leakage converter L−M of the interphase choke becomes equivalent to an inductance in series with the capacitance C.

Figure 4A:
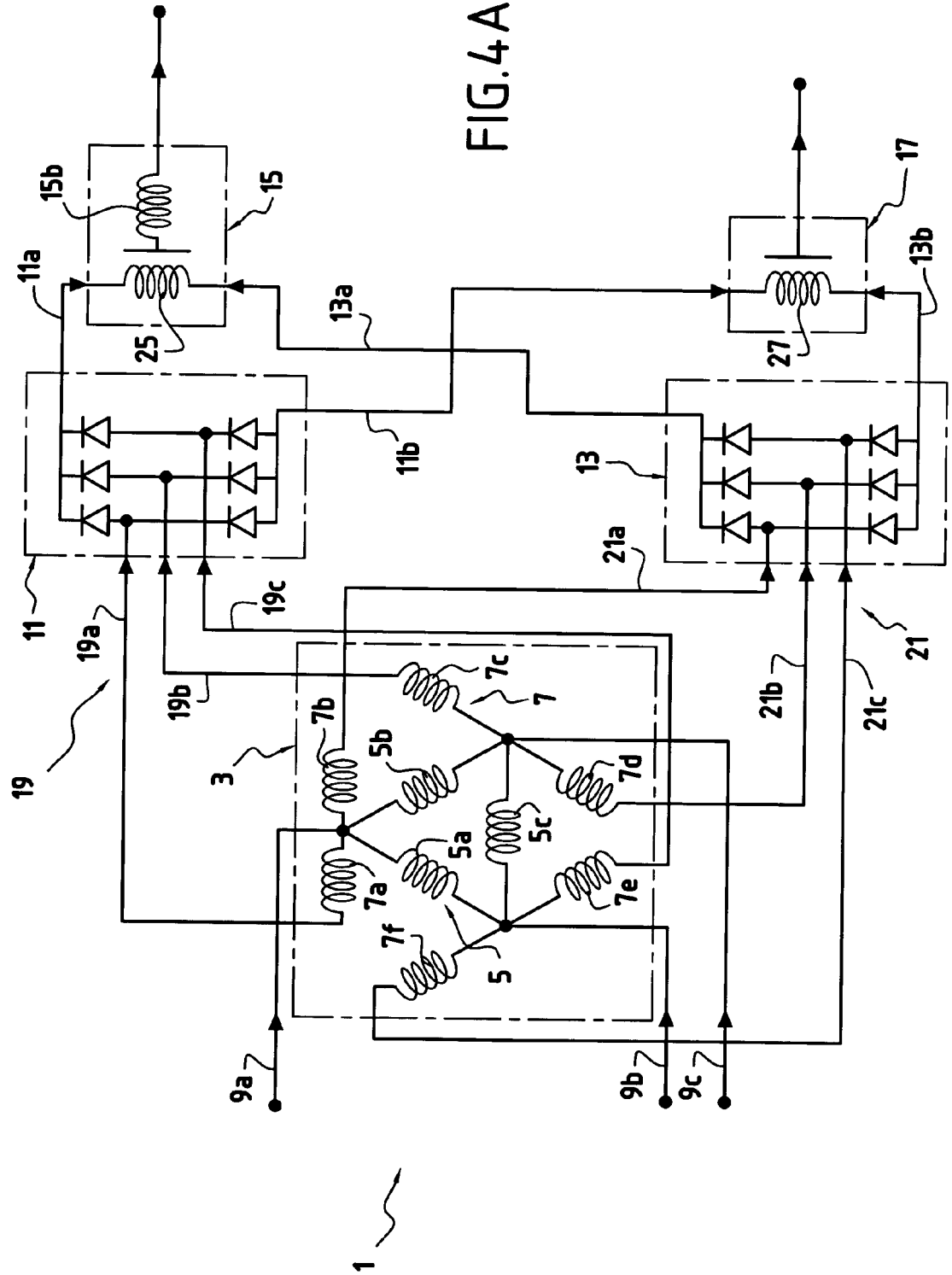
FIG. 4A is a circuit diagram of a 12-pulse converter including means for generating a magnetic leakage flux in accordance with the invention.
Figure 4B:
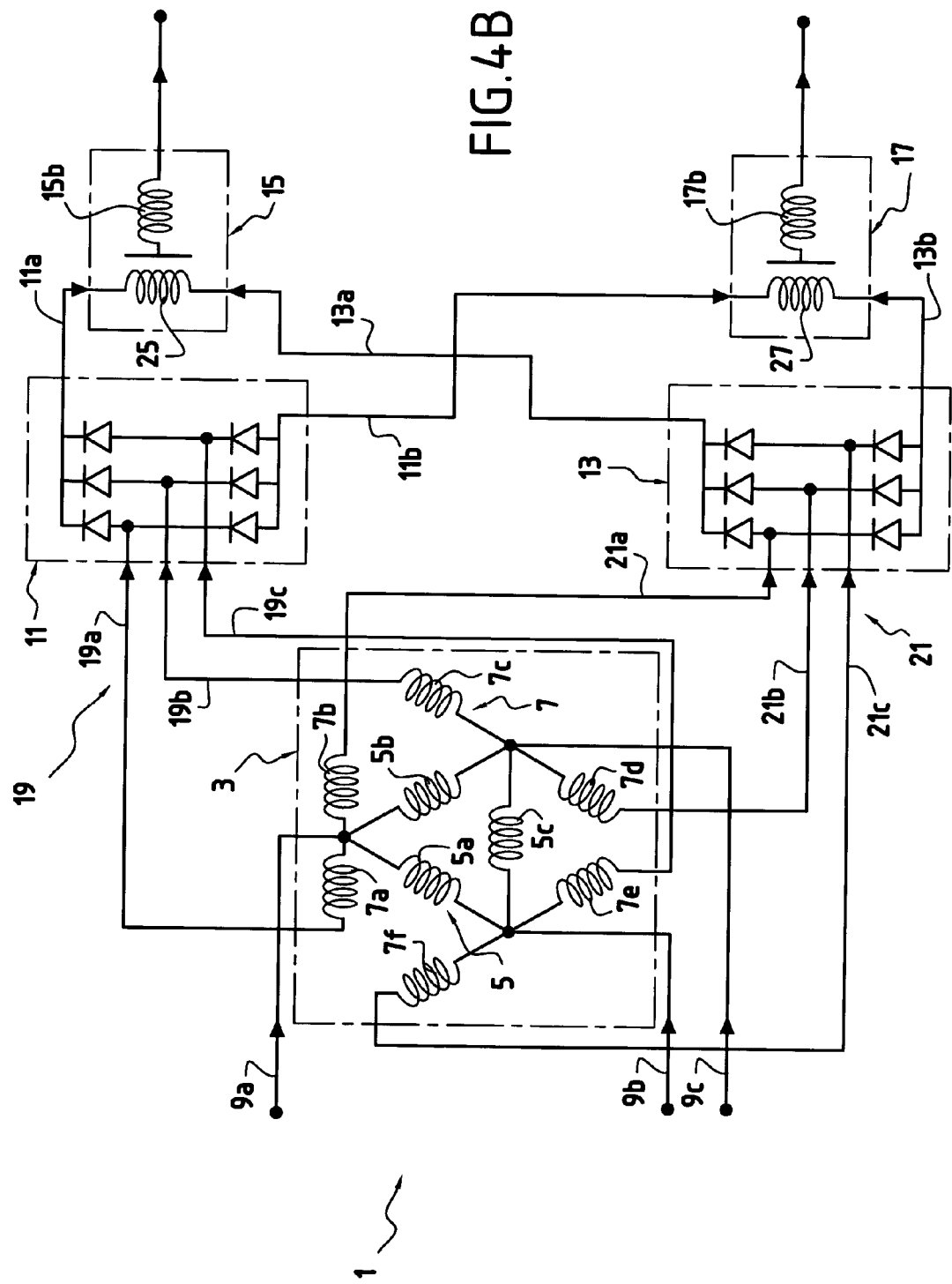
FIG. 4B shows a variant of FIG. 4A.

Below, the converter of FIGS. 4A and 4B is similar to that of FIG. 1 except in the interphase chokes 15 and 17.

FIG. 4A shows, in accordance with the invention, that the converter 1 further comprises means for generating an additional magnetic leakage flux in at least one of the interphase chokes 15 so as to incorporate a smoothing choke 15b therein.

In a variant, FIG. 4B shows that the means for generating an additional magnetic leakage flux are included in each of the interphase chokes 15 and 17, so as to incorporate a smoothing choke 15b or 17b in each of the interphase chokes 15 and 17.

In a particular embodiment of the invention, the means for generating an additional magnetic leakage flux comprise an additional number of turns in the coil 25 or 27 of at least one of the interphase chokes 15 or 17.

Figure 5:
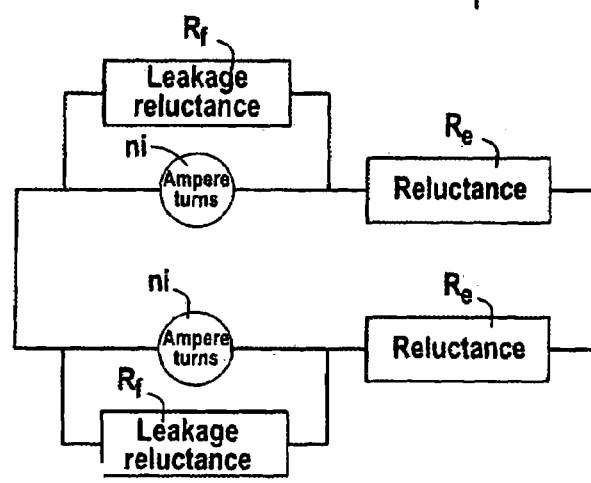
FIG. 5 is an equivalent magnetic circuit of an interphase choke.

FIG. 5 is an equivalent magnetic circuit diagram for an interphase choke, e.g. the choke shown in FIG. 2.

This equivalent magnetic circuit comprises a reluctance $R_e$ for the magnetic half-circuit that includes the reluctance of the airgap of the magnetic circuit 29, a leakage reluctance $R_f$ corresponding to the equivalent reluctance of the leakage flux paths of each of the windings 25a, 25b, and a magnetomotive force (ampere turns) ni for each winding 25a, 25b (where n is the number of turns in each winding and i is the current flowing in the windings).

In order to calculate the leakage inductance $L_f$, it is assumed that the currents passing through the two windings 25a and 25b are identical, i.e. that both windings 25a and 25b have the same ampere turns ni.

The magnetic fluxes through the reluctances $R_e$ is zero and only the fluxes through the two leakage reluctances $R_f$ differ from zero.

Thus, the leakage flux for each winding is given by:

$$L_f = L - M = \frac{n^2}{R_f}$$

The total inductance of the interphase choke is then given by:

$$L_T = 2L + 2M = 2\frac{n^2}{R_f} + 2\frac{n^2}{R}$$

Consequently, by increasing the number of turns n, it is possible to generate an additional magnetic leakage flux which increases the leakage inductance L−M.

Furthermore, in order firstly to minimize the weight and the volume of the choke, and secondly to increase the number of turns of the interphase chokes 15 and 17, it is important to select appropriately the shape and the section of the wire used to constitute the windings.

Thus, the windings of the interphase chokes 15 and 17 may be made of flat wire, thereby making it possible to obtain coils that are more compact and provide higher performance.

Figure 6:
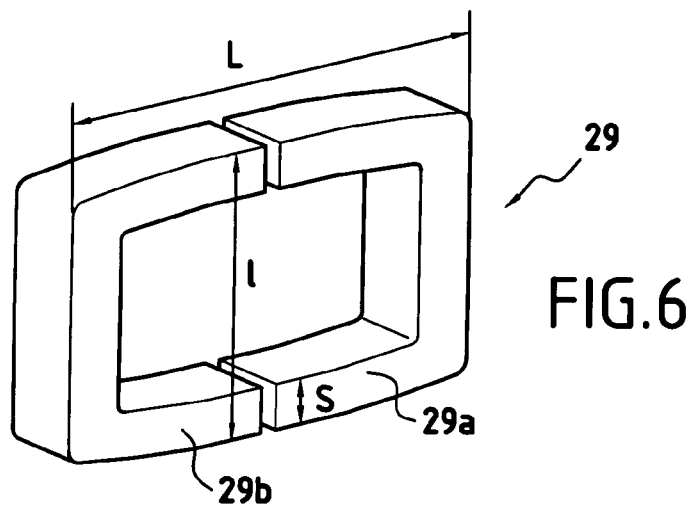
FIG. 6 is a diagrammatic view of a magnetic circuit.

By way of example, FIG. 6 shows the magnetic circuit 29 of the interphase choke of FIG. 2.

In this example, the magnetic circuit 29 comprises two C-shaped circuits 29a and 29b having a total length L of about 51 millimeters (mm), a width l of about 35 mm, and a section s of about 10 mm. Thus, a conventional interphase choke including this type of magnetic circuit and provided with two 30-turn windings possesses a total inductance 2L+2M of about 2 millihenries (mH) and a leakage inductance L−M of about 0.05 mH.

In contrast, by using two windings having 56 turns made of a flat wire having dimensions of 1.25 mm by 3.25 mm, the leakage inductance L−M of each winding can be as much as about 0.2 mH.

Given that the two windings of an interphase choke are connected in parallel, the total leakage inductance is (L−M)/2, i.e. about 0.1 mH.

Consequently, by introducing a leakage inductance in each interphase choke 15 and 17 (see FIG. 4B), the total leakage inductance for the two interphase chokes is about 0.2 mH.

In another particular embodiment of the invention, the means for generating additional magnetic leakage flux comprise a magnetic circuit which shunts a fraction of the main magnetic flux generated by at least one of the interphase chokes.

Figure 7:
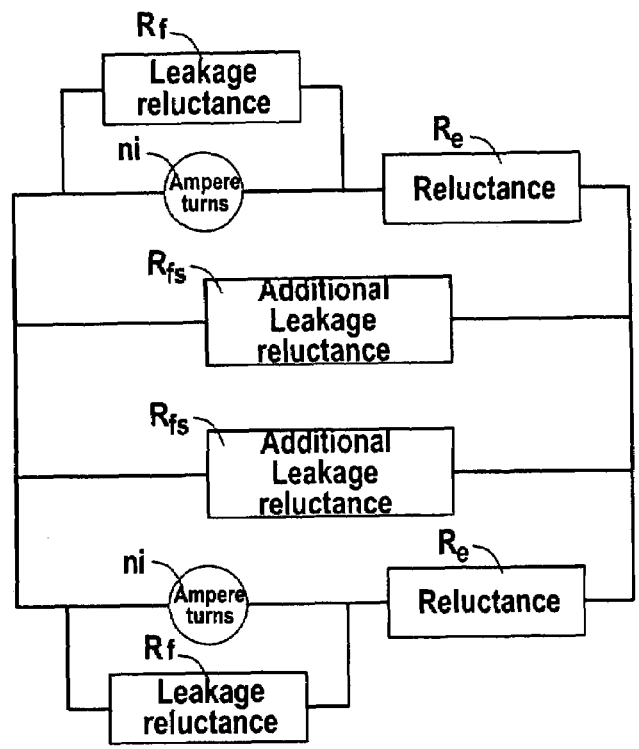
FIG. 7 is an equivalent magnetic diagram of an interphase choke of the invention.

FIG. 7 is an equivalent magnetic circuit diagram showing an interphase choke comprising not only a main magnetic circuit, but also a secondary magnetic circuit.

The diagram of FIG. 7 includes additional leakage reluctances $R_{fs}$ corresponding to leakage paths introduced by a secondary magnetic circuit, in addition to the elements already shown in the diagram of FIG. 5 which corresponds to the main magnetic circuit.

In order to calculate the leakage inductances, it is assumed that the currents carried by the two windings 25a and 25b of an interphase choke are identical, i.e. that the two windings 25a and 25b have the same ampere turns ni.

The flux in the main magnetic circuit is not zero. The additional leakage flux generated by the magnetomotive forces in each of the windings is looped via the reluctances $R_e$ and $R_{fs}$.

Under such circumstances, the total leakage inductance $L_{ft}$ for each winding is given by:

$$L_{ft} = L - M = \frac{n^2}{R_f} + \frac{n^2}{R + R_{fs}}$$

In contrast, the total inductance of the interphase choke remains influenced by the presence of the secondary magnetic circuit and is obtained using the same formula as before:

$$L_T = 2L + 2M = 2\frac{n^2}{R_f} + 2\frac{n^2}{R}$$

It should be observed that it is necessary to take account of saturation in the magnetic circuit when dimensioning an interphase choke 15, 17. Saturation in the magnetic circuit leads to a large decrease in the total inductance $L_T$, thereby compromising the effectiveness of the interphase choke.

The main magnetic circuit and/or the secondary magnetic circuit of an interphase choke may be made using one of the following alloys: a silicon iron alloy; a cobalt iron alloy; and an amorphous material alloy.

Naturally, it is possible to envisage increasing the number of winding turns and also to add an additional magnetic circuit.

Figure 8A:
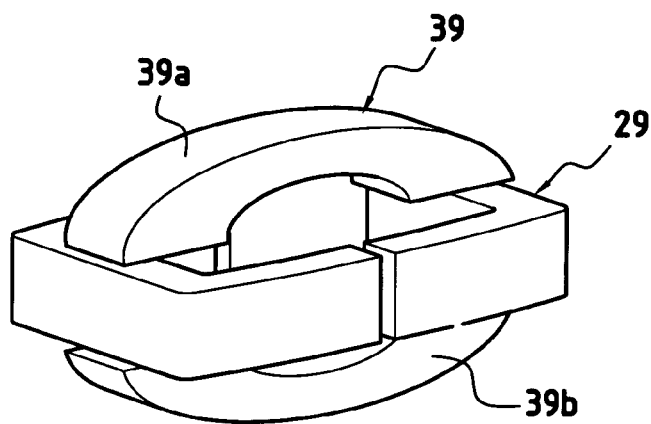
FIGS. 8A and 8B are highly diagrammatic views of a magnetic circuit of FIG. 7.

By way of example, FIG. 8A shows a magnetic circuit for an interphase choke comprising a main magnetic circuit 29 similar to that of FIG. 6, and an additional magnetic circuit 39 made up of two C-shaped magnetic circuits 39a and 39b.

Figure 8B:
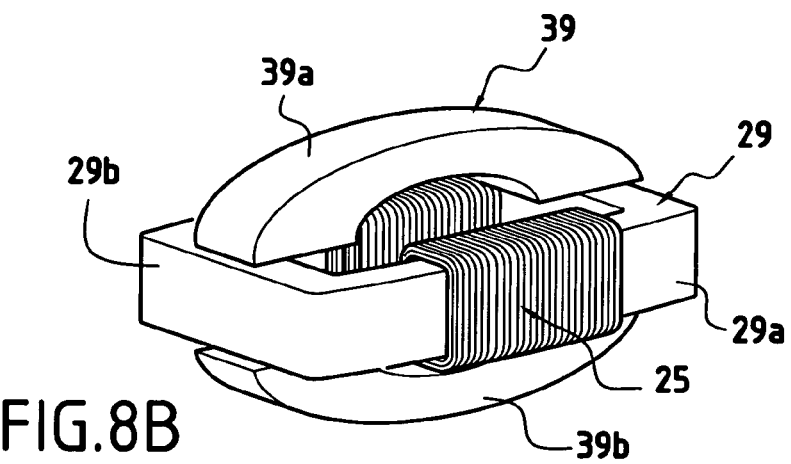

FIG. 8B shows an interphase choke comprising a main magnetic circuit 29, a secondary magnetic circuit 29, and windings 25.

Thus, in this example, by adding a secondary magnetic circuit 39 (e.g. having substantially the same shape and size as the main magnetic circuit) to the main magnetic circuit 29, and by using 52-turn windings (four layers of 13 turns) about the main circuit (see FIG. 7B) using flat wire having dimensions of 1.25 mm by 3.25 mm, it is possible to obtain an interphase choke with leakage inductance of about 0.35 mH, which is sufficient to replace a smoothing choke.

Figure 9:
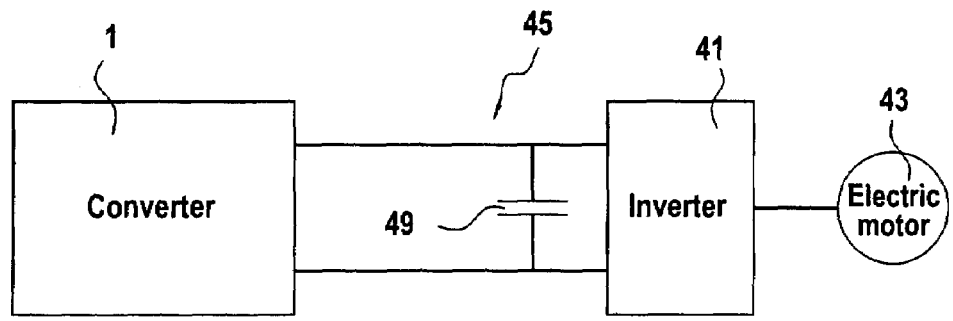
FIG. 9 is a highly diagrammatic view of a control system comprising an inverter and a 12-pulse converter of the invention.
Figure 10:
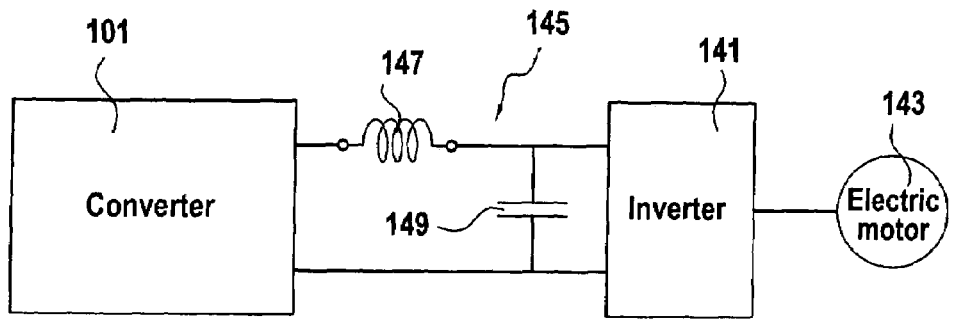
FIG. 10 is a highly diagrammatic view of a prior art control system.

FIG. 9 shows a system for controlling an electric motor 43, which system comprises an inverter 41 and a converter 1 including a smoothing choke generated by leakage inductance obtained in the manner described above. The converter 1 is then coupled to the inverter 41 via an intervening capacitor 49. It is no longer necessary to include a smoothing choke in series with the capacitor 49. This enables the weight and the volume of the control system to be optimized.

In addition, the absence of a filtering choke at the input to the inverter 41 reduces the number of coils and the number of connections, thereby improving the efficiency of the control system, increasing its reliability, and reducing its cost.

What is claimed is:

1. A 12-pulse converter comprising an autotransformer having a primary winding connected in a delta configuration and two secondary windings connected in star configurations, the two secondary windings being connected to two rectifier bridges that are enabled to operate in parallel by two interphase chokes, the converter further comprising means comprising a magnetic circuit shunting a fraction of the main magnetic flux generated by at least one interphase choke to generate an additional magnetic leakage flux at said at least interphase choke so as to incorporate a smoothing choke therein.

2. A converter according to claim 1, wherein said means generate an additional magnetic leakage flux in each interphase choke.

3. A converter according to claim 1, wherein the magnetic circuit is constituted by one of the following alloys: a silicon iron alloy; a cobalt iron alloy; and an amorphous material alloy.

4. A converter according to claim 1, wherein said means for generating an additional magnetic leakage flux further comprise an additional number of turns in a coil included in at least one of the interphase chokes.

5. A converter according to claim 4, wherein the windings of the interphase chokes are made using flat wires.

6. A system for controlling an electric motor, the system comprising an inverter and a 12-pulse converter comprising an autotransformer having a primary winding connected in a delta configuration and two secondary windings connected in star configuration, the two secondary windings being connected to two rectifier bridges that are enabled to operate in parallel by two interphase chokes, the converter further comprising means comprising a magnetic circuit shunting a fraction of the main magnetic flux generated by at least one interphase choke to generate an additional magnetic leakage flux at said at least interphase choke so as to incorporate a smoothing choke therein, said converter being coupled to said inverter via an intermediate capacitor.

* * * * *